(12) United States Patent
Hoshino

(10) Patent No.: US 10,122,003 B2
(45) Date of Patent: Nov. 6, 2018

(54) BATTERY-PACK CASE

(71) Applicant: NGK INSULATORS, LTD., Nagoya (JP)

(72) Inventor: Koji Hoshino, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 288 days.

(21) Appl. No.: 15/064,928

(22) Filed: Mar. 9, 2016

(65) Prior Publication Data

US 2016/0190541 A1 Jun. 30, 2016

Related U.S. Application Data

(63) Continuation of application No. PCT/JP2014/072373, filed on Aug. 27, 2014.

(30) Foreign Application Priority Data

Sep. 11, 2013 (JP) ................................ 2013-188272

(51) Int. Cl.
| | | |
|---|---|---|
| H01M 2/20 | (2006.01) | |
| H01M 10/39 | (2006.01) | |
| H01M 2/10 | (2006.01) | |
| H01M 2/30 | (2006.01) | |
| H01M 10/615 | (2014.01) | |
| H01M 10/6571 | (2014.01) | |
| H01M 10/658 | (2014.01) | |

(Continued)

(52) U.S. Cl.
CPC ......... *H01M 2/202* (2013.01); *H01M 2/1088* (2013.01); *H01M 2/1223* (2013.01); *H01M 2/208* (2013.01); *H01M 2/305* (2013.01); *H01M 10/3909* (2013.01); *H01M 10/48* (2013.01); *H01M 10/615* (2015.04); *H01M 10/658* (2015.04); *H01M 10/6571* (2015.04)

(58) Field of Classification Search
None
See application file for complete search history.

(56) References Cited

U.S. PATENT DOCUMENTS

| | | | | |
|---|---|---|---|---|
| 2003/0215702 | A1* | 11/2003 | Tanjou | .................. H01M 2/204 429/127 |
| 2008/0063929 | A1* | 3/2008 | Byun | ................... H01M 2/202 429/121 |
| 2008/0220319 | A1 | 9/2008 | Takagi et al. | |

FOREIGN PATENT DOCUMENTS

| | | |
|---|---|---|
| JP | 2004-055373 A1 | 2/2004 |
| JP | 2008-226488 A1 | 9/2008 |
| JP | 2010-205495 A1 | 9/2010 |

OTHER PUBLICATIONS

International Search Report and Written Opinion (Application No. PCT/JP2014/072373) dated Nov. 25, 2014.

* cited by examiner

*Primary Examiner* — Wojciech Haske
(74) *Attorney, Agent, or Firm* — Burr & Brown, PLLC

(57) ABSTRACT

A battery-pack case includes the following: a metal base; a container that has an opening in the top surface thereof, accommodates a battery pack, and is affixed to the metal base; a lid that closes the opening in the container; a positive-electrode bus bar and a negative-electrode bus bar provided on an exterior surface of the container, with a conductive member connected to each of the bus bars; and a plurality of wires that lead inside the container from the outside thereof. The wires are routed between the positive-electrode bus bar and the negative-electrode bus bar so as not to interfere with the aforementioned conductive members.

10 Claims, 15 Drawing Sheets

(51) Int. Cl.
*H01M 2/12* (2006.01)
*H01M 10/48* (2006.01)

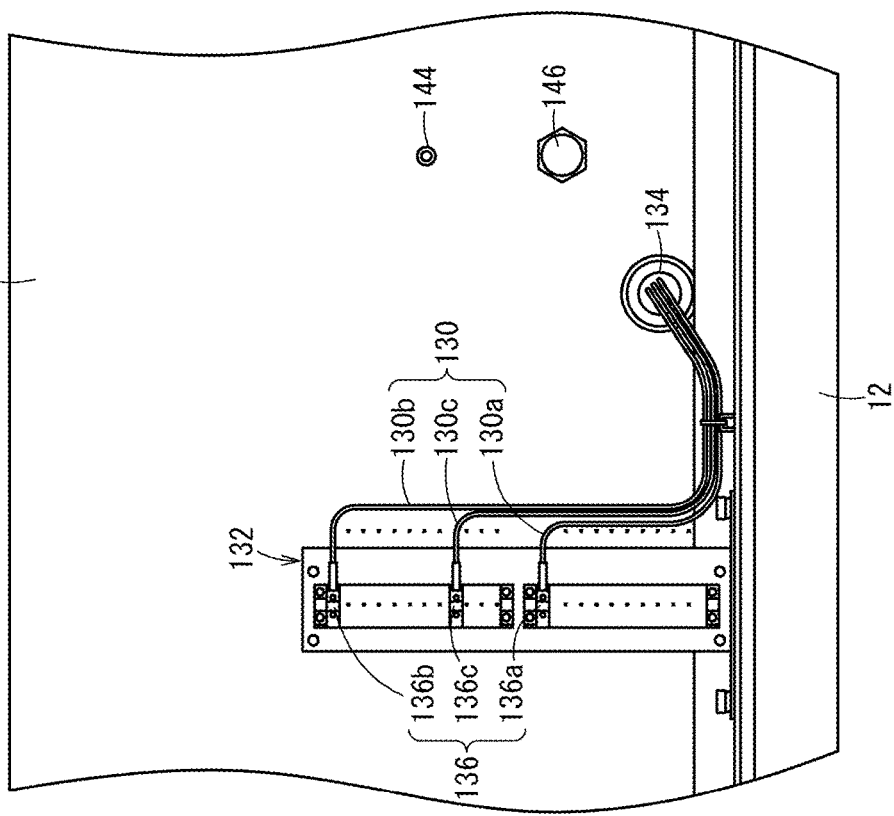
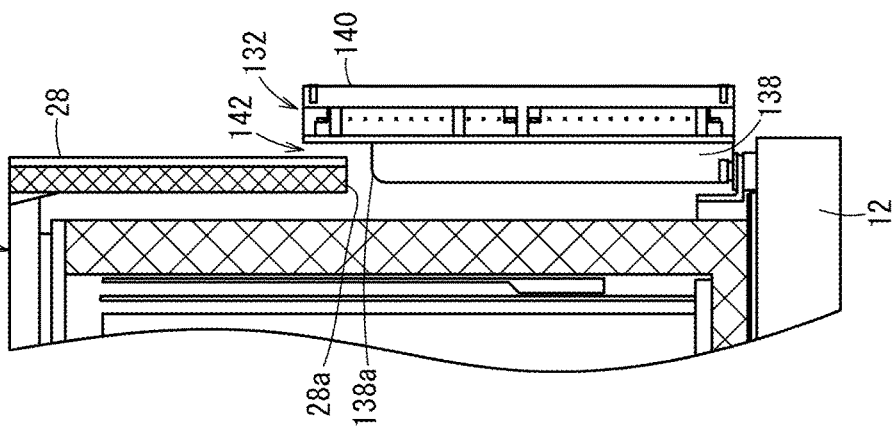

BATTERY-PACK CASE

CROSS-REFERENCE TO RELATED APPLICATIONS

This application is a Continuation of International Application No. PCT/JP2014/072373 filed on Aug. 27, 2014, which is based upon and claims the benefit of priority from Japanese Patent Application No. 2013-188272 filed on Sep. 11, 2013, the contents all of which are incorporated herein by reference.

BACKGROUND OF THE INVENTION

Field of the Invention

The present invention relates to a battery assembly container (battery-pack case) for accommodating a battery assembly.

Description of Related Art

In general, frequency adjustment in an electric power system and adjustment of power demands and power supplies in the electric power system are carried out using a plurality of power generators, storage batteries, etc., equipped in the electric power system. Further, in most cases, adjustment in the difference between the generated electric power from natural energy based power generators and its planned output electric power, and reduction in the changes of electric power generated by the natural energy based power generators are also performed using the power generators, storage batteries, etc. In comparison with general electric power generators, the storage batteries can change the electric power output at high speed, and can be used effectively in frequency adjustment of the electric power system, adjustment of the difference between the generated electric power from natural energy based power generators and its planned output electric power, and adjustment of power demands and power supplies in the electric power system.

Further, as a storage battery operated at high temperature connected to the power system, a sodium-sulfur battery (hereinafter referred to as the NaS battery) is used, for example. This NaS battery is a high temperature secondary battery containing metal sodium and sulfur as active materials in an isolated manner using a solid electrolyte pipe. When the NaS battery is heated at high temperature of about 300° C., a certain amount of energy is produced by an electrochemical reaction of both of the melted active materials. Normally, the NaS battery is formed by assembling a plurality of battery cells upright, and used in a form of a battery assembly (module) including a plurality of battery cells connected together. That is, the battery assembly has structure where circuits (strings) each formed by connecting a plurality of battery cells in series are connected in parallel to form a block, at least two blocks are connected in series to form a battery assembly, and the battery assembly is placed in a battery assembly container.

In use of the NaS battery, a plurality of heat insulating containers are stacked in the vertical direction using metal racks to form one module string, and a plurality of module strings are arranged in a lateral direction to form one electric power storage apparatus (see Japanese Laid-Open Patent Publication No. 2004-055373 and Japanese Laid-Open Patent Publication No. 2008-226488).

SUMMARY OF INVENTION

In this regard, in the conventional battery assembly container, for example, as shown in FIG. 4 of Japanese Laid-Open Patent Publication No. 2008-226488, a positive electrode external terminal and a negative electrode external terminal are provided in the outer surface of the battery assembly container. The positive electrode external terminal and the negative electrode external terminal are connected to a positive electrode and a negative electrode of the battery assembly in the battery assembly container, respectively. For example, the positive electrode external terminal is provided on the right side, and the negative electrode external terminal is provided on the left side, of the outer surface. When two heat insulating containers that are adjacent to each other in the vertical direction are considered, for example, the positive electrode external terminal of the upper heat insulating container and the negative external terminal of the lower heat insulating container are electrically connected through a cable.

In this case, since the cable is provided adjacent to a lid of the battery assembly container, when the battery assembly is partially combusted, the cable is affected by the combustion easily. For example, metal wires exposed from the cable due to the combustion may contact the metal base frame, and insulation of the cable may not be maintained undesirably.

Further, in the battery assembly container, for example, various heaters for maintaining the temperature in the battery assembly container at a certain level, various measurement instruments for measuring the block voltage, etc., and various sensors for measuring the temperature, etc. in the battery assembly container are provided. To this end, in addition to the above described cable, wiring lines (heater wires) to the various heaters, and wiring lines (signal lines) from the various measurement instruments and the various sensors need to be provided inside and outside the battery assembly container. Therefore, there is also a demand to perform operation to provide the wiring lines reliably and promptly.

The present invention has been made taking such a problem into account, and an object of the present invention is to provide a battery assembly container in which even if the battery assembly is partially combusted, the cable is not affected easily by the combustion, and it becomes possible to perform operation to provide the wiring lines reliably and promptly.

[1] A battery assembly container according to the present invention includes a metal base frame, a box body fixed to the base frame, the box body including an opening in an upper surface of the box body, and accommodating a battery assembly, a lid body configured to close the opening of the box body, a positive electrode external terminal and a negative electrode external terminal provided for one outer surface of the box body, and connected to electrically conductive members, respectively, and a plurality of wiring lines extending from outside of the box body to inside of the box body. The plurality of wiring lines are provided between the positive electrode external terminal and the negative electrode external terminal at a position where no interference with the electrically conductive members occurs.

In the structure, even if the battery assembly is partially combusted, the electrically conductive members and the plurality of wiring lines are not affected easily by the combustion. Even if operation to provide the plurality of wiring lines is performed after connecting the electrically conductive members, the wiring lines can be provided without obstruction by the electrically conductive members.

Likewise, even in the case of connecting the electrically conductive members after operation of providing the plurality of wiring lines, the electrically conductive members can be connected without obstruction by the plurality of wiring lines. Consequently, the operation of providing the wiring lines can be performed reliably and promptly.

[2] In the present invention, the position where no interference with the electrically conductive members occurs may represent a position where a projected area of the plurality of wiring lines on the base frame does not overlap with projected areas of the electrically conductive members on the base frame. The electrically conductive members are connected to the positive electrode external terminal and the negative electrode external terminal, respectively.

[3] In the present invention, a lead-out direction of a connector portion of the electrically conductive member connected to the positive electrode external terminal and a lead-out direction of a connector portion of the electrically conductive member connected to the negative electrode external terminal are oriented away from each other. In the structure, the plurality of wiring lines can be provided between the positive electrode external terminal and the negative electrode external terminal, at a position where no interference with the electrically conductive members occurs.

[4] In this case, the electrically conductive member connected to the positive electrode external terminal may be connected to a negative electrode external terminal of an adjacent battery assembly container provided on one side in a lateral direction, and the electrically conductive member connected to the negative electrode external terminal may be connected to a positive electrode external terminal of an adjacent battery assembly container provided on another side in the lateral direction. In the structure, since the wiring lines connected to the external terminals of the battery assembly containers are arranged in the lateral direction of the battery assembly containers, in the case where the battery assembly is partially combusted, the plurality of wiring lines are not affected by the combustion easily.

[5] In the present invention, the battery assembly container may further comprise a terminal frame connected to the plurality of wiring lines, and the terminal frame may be provided on the base frame, at a position between the positive electrode external terminal and the negative electrode external terminal. In the structure, the plurality of wiring lines can be provided locally between the positive electrode external terminal and the negative electrode external terminal. Further, it becomes possible to easily identify types of the wiring lines easily. It is a matter of course that the plurality of wiring lines may be provided at a position where no interference with the electrically conductive members occurs.

[6] In this case, the terminal frame may be configured to have no interference with the lid body. Therefore, even if the number of wiring lines is increased, and the length of the terminal frame in the vertical direction is increased, the terminal frame does not interfere with (e.g., contact) the lid body. Accordingly, it is possible to cope with the increase in the number of battery cells accommodated in the box body, and the increase in the number of measured points easily.

[7] For example, the configuration having no interference with the lid body may include a gap formed at least between a portion of the terminal frame facing the lid body and a portion of the lid body facing the terminal frame.

[8] In the present invention, a member configured to insert the plurality of wiring lines may be provided in the outer surface of the box body, at a position between the positive electrode external terminal and the negative electrode external terminal. Accordingly, the plurality of wiring lines can be provided at a position where no interference with the electrically conductive members occurs.

[9] In the present invention, a vacuum sensor and a vacuum seal plug used for adjusting a degree of vacuum inside the box body may be provided in the outer surface of the box body, at positions between the positive electrode external terminal and the negative electrode external terminal. In the structure, evacuation operation and sealing operation in the box body can be performed without obstruction by the plurality of wiring lines, the terminal frame, etc., and improvement in the work efficiency of these operations can be achieved.

[10] In the present invention, a member configured to insert the plurality of wiring lines connected to the terminal frame may be provided in the outer surface of the box body, at a position between the terminal frame and one of the positive electrode external terminal and the negative electrode external terminal, and a vacuum sensor and a vacuum seal plug used for adjusting a degree of vacuum inside the box body may be provided in the outer surface of the box body, at positions between the member and one of the positive electrode external terminal and the negative electrode external terminal.

[11] In the present invention, a member configured to insert the plurality of wiring lines connected to the terminal frame may be provided in the outer surface of the box body, at a position between the terminal frame and one of the positive electrode external terminal and the negative electrode external terminal, and a vacuum sensor and a vacuum seal plug used for adjusting a degree of vacuum inside the box body may be provided in the outer surface of the box body, at positions between the terminal frame and another of the positive electrode external terminal and the negative electrode external terminal.

[12] In the present invention, a member configured to insert the plurality of wiring lines connected to the terminal frame may be provided in the outer surface of the box body, at a position between the terminal frame and one of the positive electrode external terminal and the negative electrode external terminal, and a vacuum sensor and a vacuum seal plug used for adjusting a degree of vacuum inside the box body may be provided in the outer surface of the box body, at positions between the terminal frame and the member.

As described above, in the battery assembly container according to the present invention, even if the battery assembly is partially combusted, the cable is not affected easily by the combustion, and it becomes possible to perform operation of providing the wiring lines reliably and promptly.

BRIEF DESCRIPTION OF DRAWINGS

FIG. 10A is a side view showing main components in a state where a terminal frame is provided on the base frame of the battery assembly container, with partially broken away;

FIG. 10B is a front view showing this state;

DETAILED DESCRIPTION OF THE INVENTION

Hereinafter, an embodiment of a battery assembly container according to the present invention applied to, e.g., a NaS battery will be described with reference to FIGS. 1 to 15.

Figure 1:
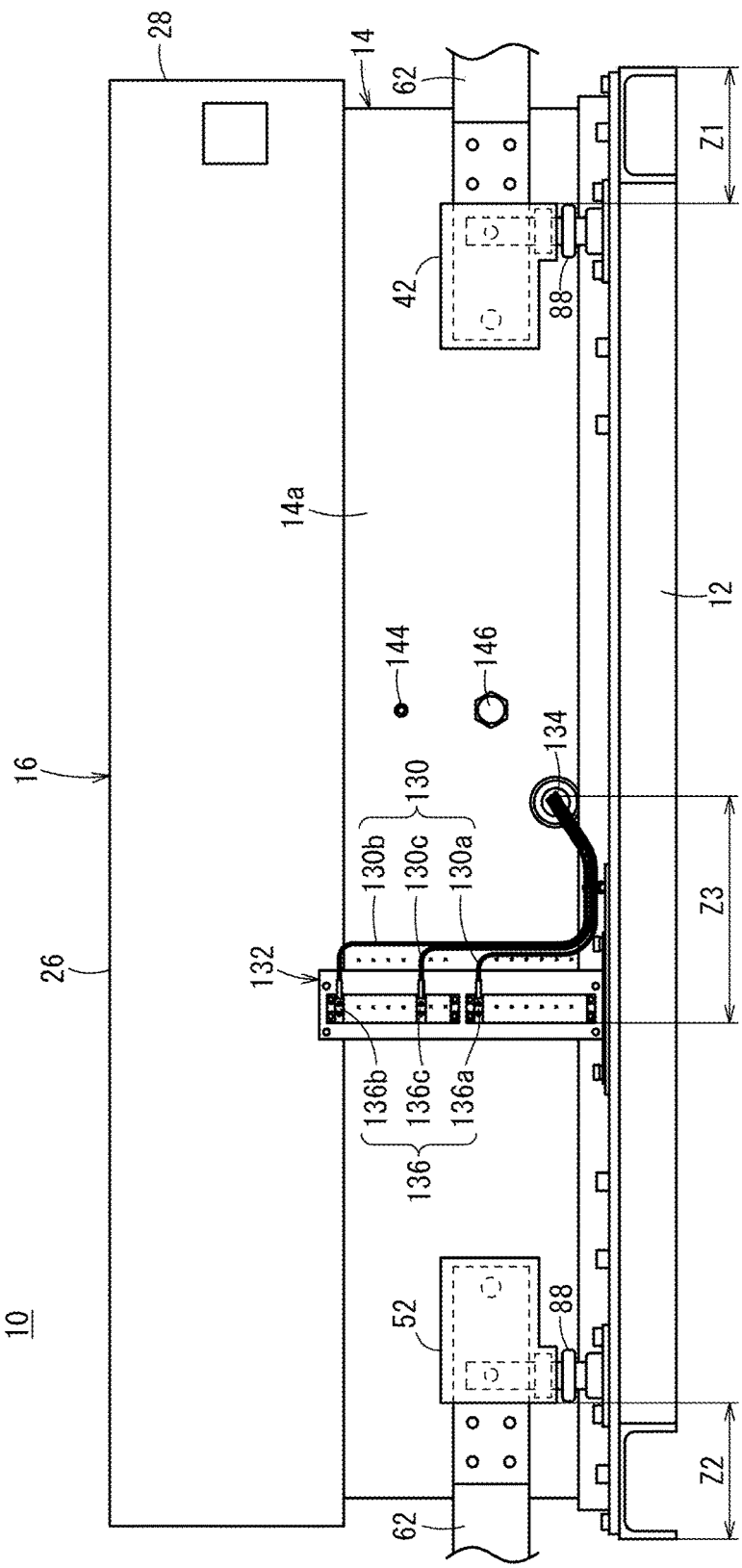
FIG. 1 is a front view showing a battery assembly container according to an embodiment of the present invention.

A battery assembly container 10 according to the embodiment of the present invention has a substantially rectangular shape as viewed from above. As shown in FIG. 1, the battery assembly container 10 includes a box body 14 of, e.g., a vacuum heat insulating design specification placed on a base frame 12 made of, e.g., steel material, and a lid body 16 of, e.g., an atmospheric air heat insulating design specification for closing an opening of the box body 14.

Figure 2:
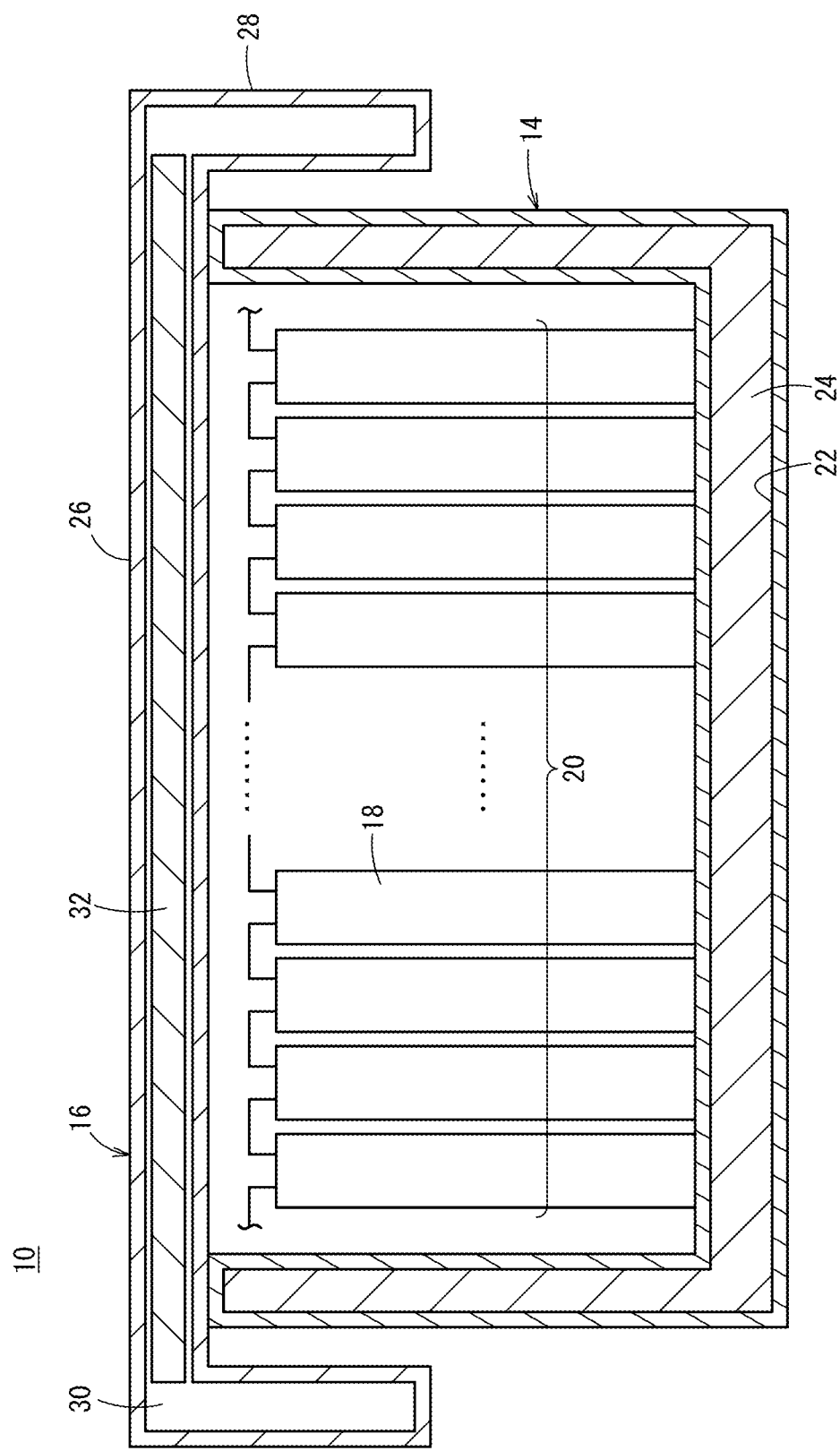
FIG. 2 is a vertical cross sectional view showing the battery assembly container with partial omission.

As shown in FIG. 2, a battery assembly 20 made up of a large number of battery cells 18 is accommodated in the box body 14. For example, each of the battery cells 18 has a cylindrical shape, and is accommodated in the box body 14 in a state where the axial direction of the battery cells 18 is oriented vertically. Further, in order to suppress damages and abnormal heating of the battery cells 18 or leakage of active material, etc., though not shown, as fire extinction sand, silica sand is filled in a gap between the box body 14 and the battery assembly 20.

For example, the box body 14 has a substantially rectangular parallelepiped shape, and includes four side walls and a bottom wall. An opening is formed in an upper surface of the box body 14. For example, the box body 14 is made of plate material of stainless steel. The box body 14 is formed in a box shape having a hollow area 22 in itself. The hollow area 22 is a hermetical space which is sealed in an air-tight manner. The hollow area 22 is connectable to the external space by a vacuum valve (not shown). A porous vacuum heat insulating board 24 formed by solidifying glass fiber into a plate shape using adhesive is loaded in the hollow area 22 to achieve vacuum heat insulating structure of the box body 14.

The lid body 16 includes a ceiling wall 26 and eaves 28, and provided to close the opening in the upper surface of the box body 14. In the same manner as in the case of the box body 14, the lid body 16 is made of plate material of stainless steel. A heat insulating material layer for achieving the required minimum heat insulating property is placed under an inner surface (lower surface) of the lid body 16. At least two stacked detachable heat insulating plates 32 are filled (stacked) in a hollow area 30 to provide air heat insulating structure only in the lid body 16 (upper surface) of the battery assembly 20. In the structure, the quantity of heat radiation from the upper surface of the battery assembly 20 can be regulated. In the case where the heat insulating performance in the battery assembly 20 is important, it is a matter of course that the lid body 16 may adopt vacuum heat insulating structure as in the case of the box body 14.

Figure 3:
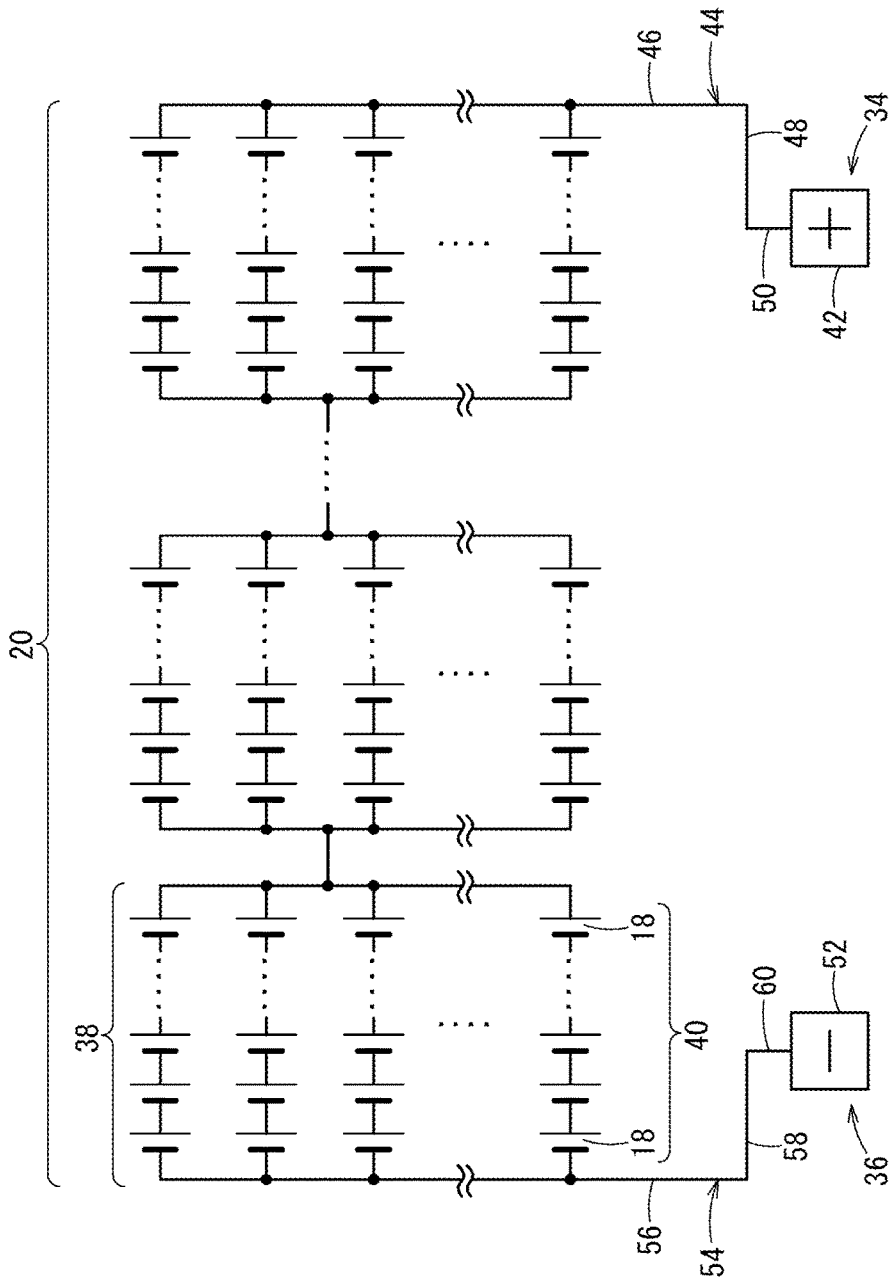
FIG. 3 is an equivalent circuit diagram showing a battery assembly contained in the battery assembly container.

As shown in FIG. 3, the battery assembly 20 is formed by connecting two or more blocks 38 in series from a positive electrode 34 to a negative electrode 36. Each of the blocks 38 is formed by connecting two or more circuits (strings 40) in parallel, and each of the strings 40 is formed by connecting two or more battery cells 18 in series.

The positive electrode 34 includes a positive electrode bus bar 42 of the positive electrode external terminal and a positive electrode bus 44 as a relay member. The positive electrode bus 44 includes a positive electrode current collector 46, a positive electrode extension 48, and a positive electrode pole 50. The negative electrode 36 includes a negative electrode bus bar 52 of the negative electrode external terminal and a negative electrode bus 54 as a relay member. The negative electrode bus 54 includes a negative electrode current collector 56, a negative electrode extension 58, and a negative electrode pole 60.

Next, an example of specific structure of the positive electrode 34 and the negative electrode 36 will be described with reference to FIGS. 4 and 5.

Figure 4:
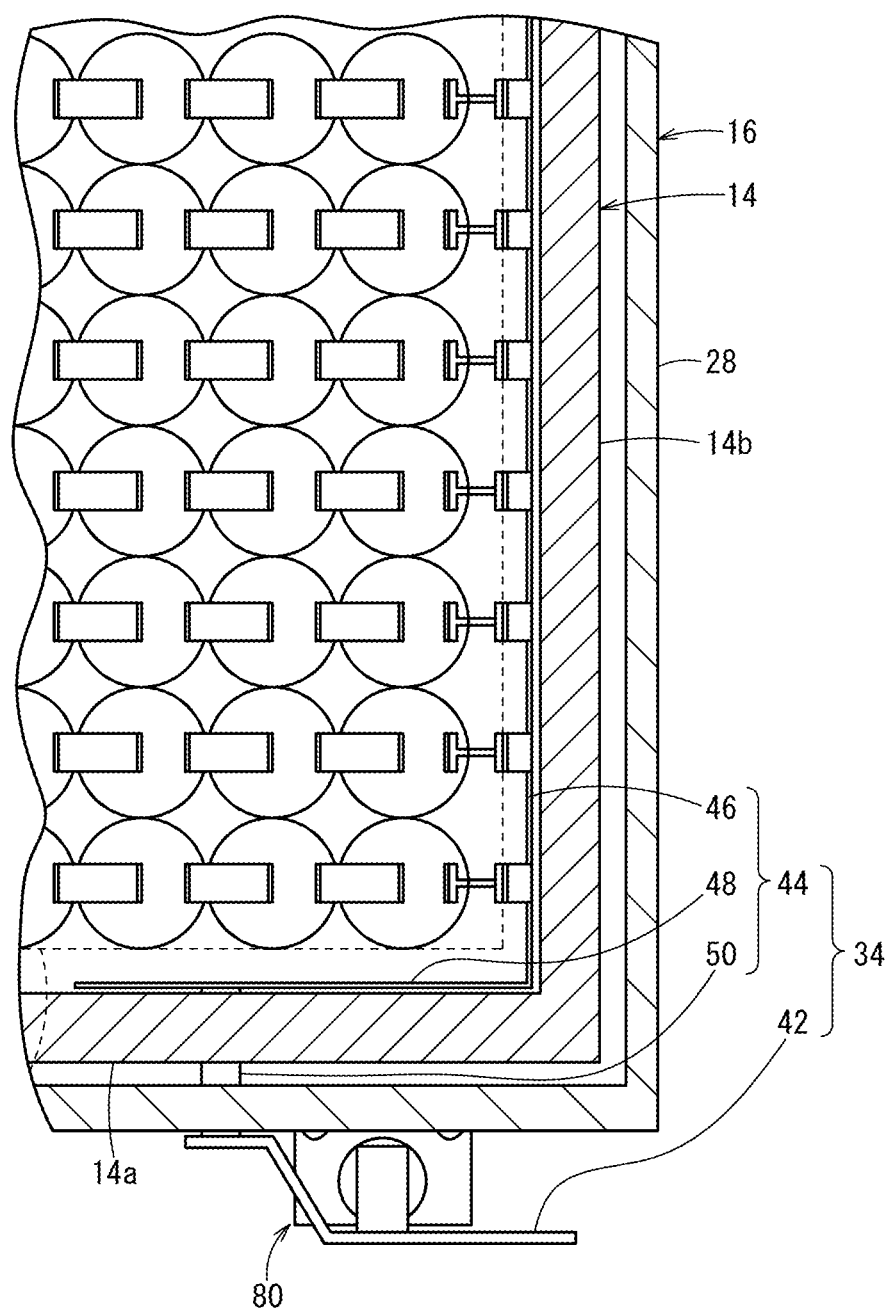
FIG. 4 is a lateral sectional view showing part (positive electrode side) of the battery assembly container.

As shown in FIG. 4, the positive electrode current collector 46 and the positive electrode extension 48 of the positive electrode 34 are accommodated in an accommodation space of the box body 14. The positive electrode pole 50 extends through a first side wall 14a of the box body 14. The positive electrode current collector 46 and the positive electrode extension 48 are formed by bending an intermediate portion of one electrically conductive material (e.g., metal plate) at a right angle. The positive electrode current collector 46 is provided along an inner surface of a second side wall 14b. The positive electrode extension 48 is provided along an inner surface of the first side wall 14a. The positive electrode pole 50 is joined to the positive electrode extension 48 in the accommodation space of the box body 14, and joined to the positive electrode bus bar 42 outside the box body 14.

Figure 5:
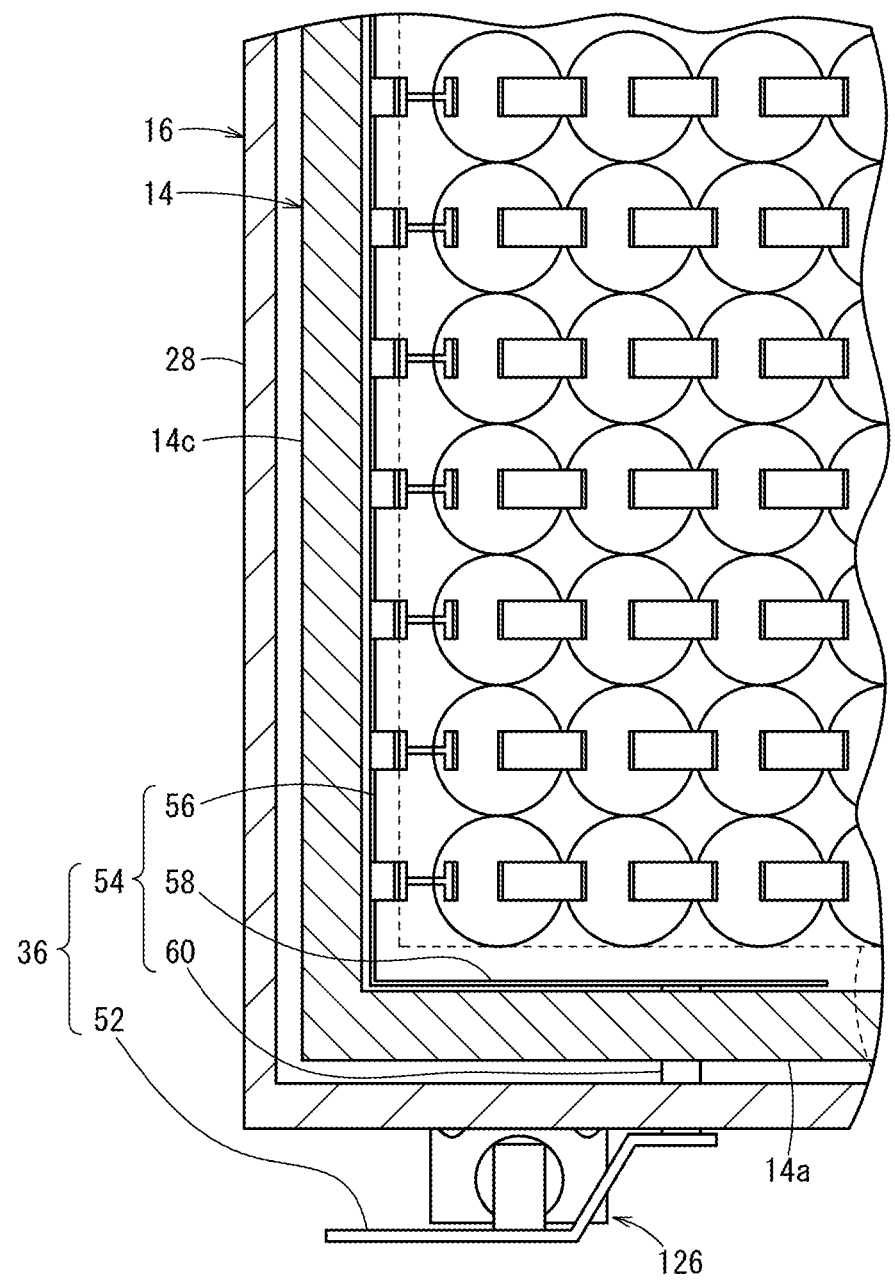
FIG. 5 is a lateral cross sectional view showing part (negative electrode side) of the battery assembly container.

As shown in FIG. 5, the negative electrode current collector 56 and the negative electrode extension 58 are accommodated in the accommodation space. The negative electrode pole 60 extends through the first side wall 14a. The negative electrode current collector 56 and the negative electrode extension 58 are formed by bending an intermediate portion of one electrically conductive material (e.g., metal plate) at a right angle. The negative electrode current collector 56 is provided along an inner surface of a third side wall 14c. The negative electrode extension 58 is provided along an inner surface of the first side wall 14a.

The negative electrode pole 60 is joined to the negative electrode extension 58 in the accommodation space, and joined to the negative electrode bus bar 52 outside the box body 14.

It should be noted that since the above described positive electrode current collector 46, the positive electrode extension 48, the negative electrode current collector 56, and the negative electrode extension 58 are made of metal plates, this structure contributes to reduction in the electrical resistance of the positive electrode bus 44 and the negative electrode bus 54. It is a matter of course that each of the positive electrode current collector 46 and the positive electrode extension 48, and the negative electrode current collector 56 and the negative electrode extension 58 may be formed by joining two or more electrically conductive parts or components. Further, since each of the positive electrode pole 50 and the negative electrode pole 60 has a pole shape, this structure contributes to suppression of movement of the heat into, and out of the box body 14 through the positive electrode pole 50 and the negative electrode pole 60.

Then, an electrically conductive member 62 is connected to each of the positive electrode bus bar 42 and the negative electrode bus bar 52 (see FIG. 1). Now, a state where the electrically conductive member 62 is connected to the positive electrode bus bar 42 of the battery assembly 20 will be described with reference to FIGS. 6 to 8.

Next, the state where the electrically conductive member 62 is connected to the positive electrode bus bar 42 of the battery assembly 20 will be described with reference to FIGS. 6 and 7.

Figure 6:
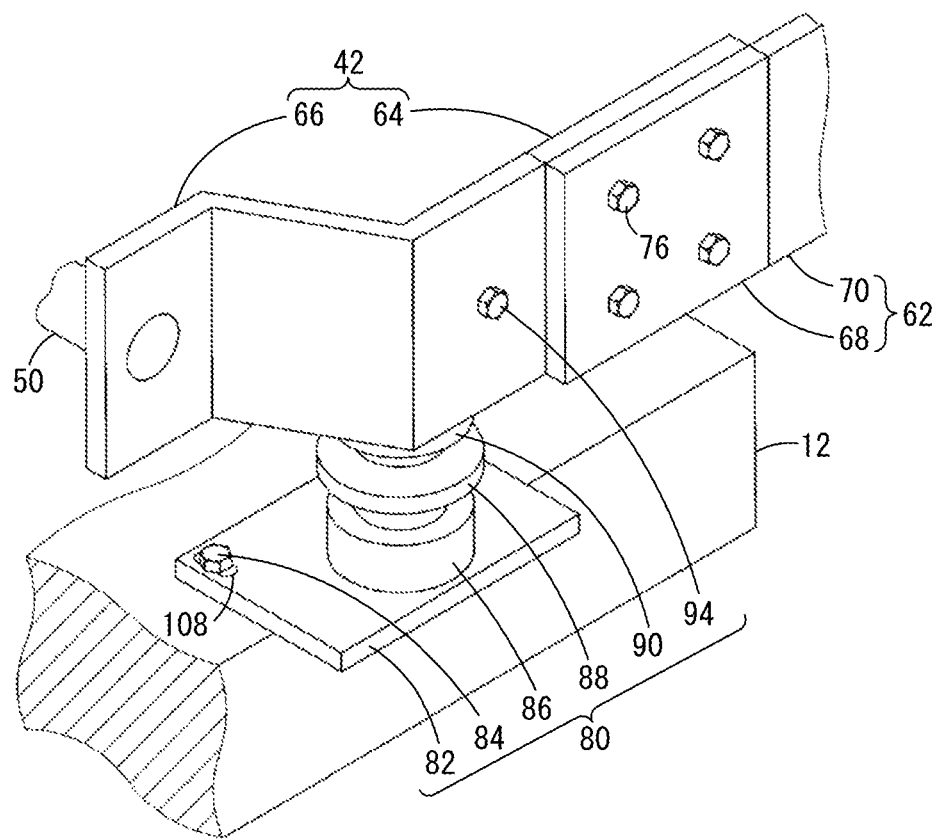
FIG. 6 is a perspective view showing part of a positive electrode bus bar, a positive electrode support body, and a base frame.
Figure 7:
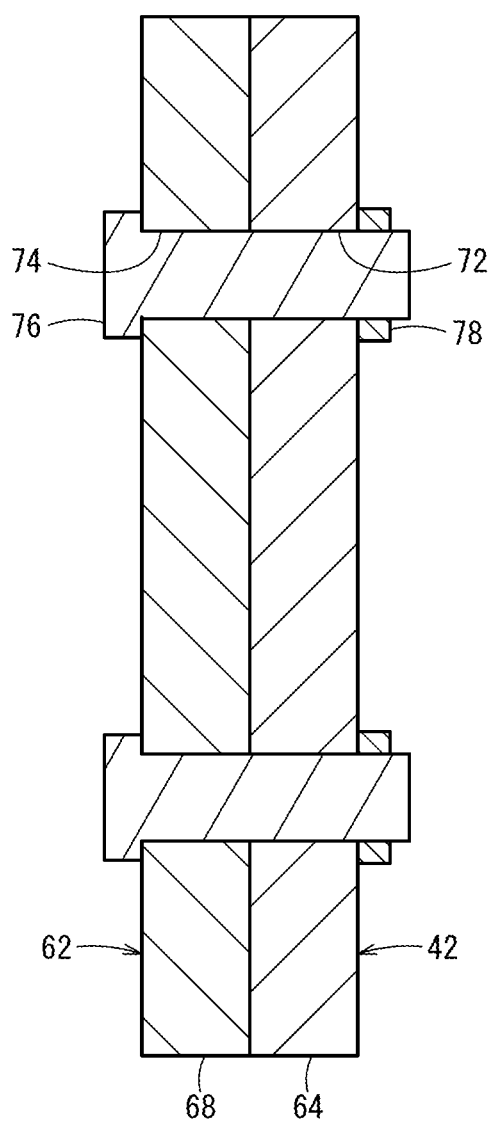
FIG. 7 is a cross sectional view showing connection structure of a conductor connector of the positive electrode bus bar and a connector of an electrically conductive member.

As shown in FIG. 6, the positive electrode bus bar 42 includes a conductor connector 64 and a bent portion 66. The electrically conductive member 62 electrically connects the positive electrode bus bar 42 of one of the adjacent battery assembly containers 10 and the negative electrode bus bar 52 (not shown in FIG. 6) of the other of the adjacent battery assembly containers 10. As the electrically conductive member 62, a connector 68 made of a metal plate and metal mesh wire 70 are provided. Therefore, hang-down and deflection are suppressed, and the electrically conductive member 62 can have a shape conformed to the curved wiring line path.

The positive electrode pole 50 is joined to the bent portion 66 of the positive electrode bus bar 42. As shown in FIG. 7, a bolt hole 72 is formed in the conductor connector 64 of the positive electrode bus bar 42. A bolt hole 74 is formed also in the connector 68 of the electrically conductive member 62. The conductor connector 64 of the positive electrode bus bar 42 and the connector 68 of the electrically conductive member 62 are stacked together. Bolts 76 are inserted into bolt holes 72 formed in the conductor connector 64 of the positive electrode bus bar 42 and bolt holes 74 formed in the connector 68 of the electrically conductive member 62. The bolts 76 are screwed into nuts 78. The conductor connector 64 of the positive electrode bus bar 42 and the connector 68 of the electrically conductive member 62 are tightened together using the bolts 76 and the nuts 78.

The surface of the conductor connector 64 of the positive electrode bus bar 42 and the surface of the connector 68 of the electrically conductive member 62 are nickel plated. In this case, in comparison with the case where silver plating is used, though improvement in the durability and the heat resistance of the positive electrode bus bar 42 and the electrically conductive member 62 is achieved, the connection resistance is increased. The problem of the higher connection resistance is resolved by increasing the contact area between the conductor connector 64 of the positive electrode bus bar 42 and the connector 68 of the electrically conductive member 62, and closely tightening the conductor connector 64 of the positive electrode bus bar 42 and the connector 68 of the electrically conductive member 62 that are in contact with each other.

The positive electrode bus bar 42 has a plate shape. The conductor connector 64 of the positive electrode bus bar 42 is positioned at a position closer to one end of the positive electrode bus bar 42. The bent portion 66 of the positive electrode bus bar 42 is positioned at a position closer to the other end of the positive electrode bus bar 42. The conductor connector 64 and the bent portion 66 of the positive electrode bus bar 42 are provided in parallel with the outer surface of the first side wall 14a. The distance from the first side wall 14a to the conductor connector 64 of the positive electrode bus bar 42 is larger than the bolt length of the bolts 76, and larger than the length from the first side wall 14a to the bent portion 66. Preferably, the distance from the first side wall 14a to the conductor connector 64 of the positive electrode bus bar 42 is twice or more times as large as the bolt length.

In the case where the distance from the first side wall 14a (wall on the front side) of the box body 14 to the conductor connector 64 of the positive electrode bus bar 42 is larger than the bolt length, the bolts 76 do not contact the first side wall 14a easily.

In the case where the distance from the first side wall 14a to the bent portion 66 of the positive electrode bus bar 42 is short, the positive electrode pole 50 is short. Consequently, movement of the heat into, and out of the box body 14 through the positive electrode pole 50 is suppressed, and the temperature inside the box body 14 is regulated easily.

Figure 8:
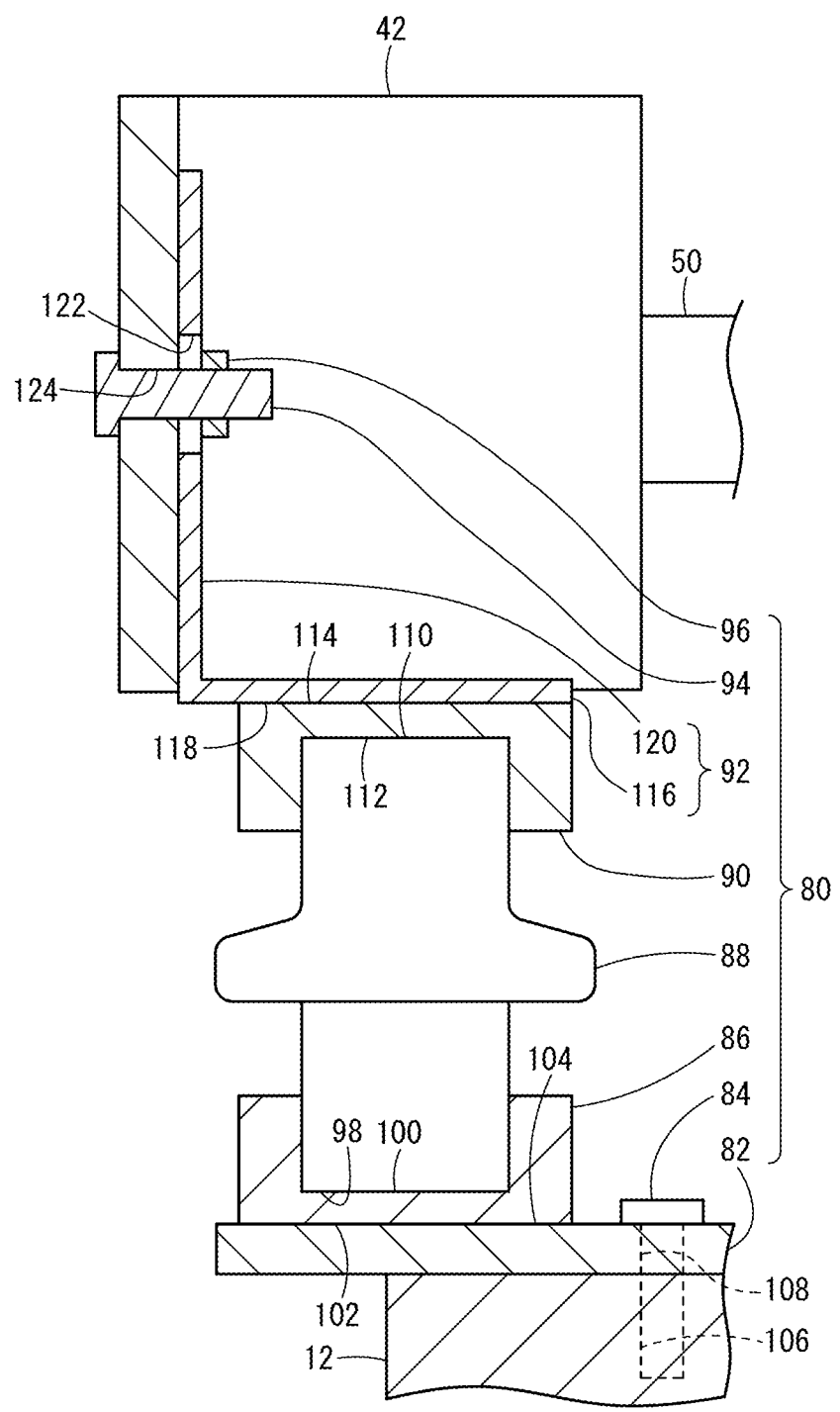
FIG. 8 is a cross sectional view showing part of the positive electrode bus bar, the positive electrode support body, and the base frame.

As shown in FIGS. 6 and 8, a positive electrode support body 80 supporting the positive electrode bus bar 42 on the base frame 12 has a pedestal 82, a pedestal fixing bolt 84, a lower end cap 86, an insulator 88, an upper end cap 90, an L angle metal 92 (see FIG. 8), and an L angle metal fixing bolt 94, and an L angle metal fixing nut 96 (see FIG. 8).

A lower end 98 of the insulator 88 and a recess 100 of the lower end cap 86 are joined together using cement. An outer surface 102 of the lower end cap 86 and an upper surface 104 of the pedestal 82 are welded together.

The pedestal 82 is fixed to the base frame 12 using the pedestal fixing bolt 84. A bolt hole 106 is formed in the base frame 12. A bolt hole 108 is formed in the pedestal 82. A screw groove is formed in the inner surface of the bolt hole 106. The pedestal 82 is placed on the base frame 12 of the battery assembly container 10. The pedestal fixing bolt 84 is inserted into the bolt hole 108 formed in the pedestal 82 and the bolt hole 106 formed in the base frame 12, and screwed into the screw groove of the bolt hole 106 formed in the base frame 12. The bolt hole 108 formed in the pedestal 82 is a long hole elongated in the depth direction of the pedestal 82. In the structure, the position of the pedestal 82 is adjustable in the depth direction.

An upper end 110 of the insulator 88 and a recess 112 of the upper end cap 90 are joined together using cement. An outer surface 114 of the upper end cap 90 and an outer surface 118 of a horizontal portion 116 of the L angle metal 92 are welded together.

A vertical portion 120 of the L angle metal 92 is fixed to the positive electrode bus bar 42 using the L angle metal fixing bolt 94 and the L angle metal fixing nut 96. A bolt hole 122 is formed in the vertical portion 120 of the L angle metal 92. A bolt hole 124 is formed in the positive electrode bus bar 42. The vertical portion 120 of the angle metal 92 and the positive electrode bus bar 42 are stacked together. The L angle metal fixing bolt 94 is inserted into the bolt hole 122 formed in the L angle metal 92 and the bolt hole 124 formed in the positive electrode bus bar 42. The L angle metal fixing bolt 94 is screwed into the L angle metal fixing nut 96. The bolt hole 122 formed in the L angle metal 92 is a long hole elongated in the vertical direction. Therefore, the position of the L angle metal 92 is adjustable in the vertical direction. Accordingly, variation of the dimension of the insulator 88 is absorbed by positional adjustment of the pedestal 82 and the L angle metal 92.

The positive electrode bus bar 42 is supported by the positive electrode support body 80. The pedestal 82 joined to the base frame 12 and the L angle metal 92 joined to the positive electrode bus bar 42 are electrically insulated by the insulator 88. As shown in FIG. 5, a negative electrode support body 126 supporting the negative electrode bus bar 52 on the base frame 12 also has the same structure in this respect.

Therefore, even in the case where the battery assembly 20 is partially combusted, and the electrically conductive member 62 is affected by the combustion, as long as the positive electrode bus bar 42 is supported by the positive electrode support body 80 and the negative electrode bus bar 52 is supported by the negative electrode support body 126, the electrically conductive member 62 is not detached easily and the electrically conductive member 62 is kept insulated electrically. Therefore, improvement in the security of the battery assembly container 10 is achieved.

Further, in the box body 14, in addition to the above described battery assembly 20, though not shown, a plurality of heaters for maintaining the inside of the box body 14 at a certain temperature, a plurality of thermometers for measuring the temperature in the box body 14, and a plurality of voltage meters for measuring the block voltage, etc. are provided. Therefore, as shown in FIG. 1, a plurality of wiring lines 130 including a plurality of heater wiring lines 130*a* for supplying electrical energy to various heaters, a plurality of signal lines 130*b* from various voltage meters, and a plurality of signal lines 130*c* from various thermometers are provided inside and outside the battery assembly container 10.

In this case, since a large number of wiring lines are present, it is preferable that these wiring lines are provided locally at one position, and types of the wiring lines can be identified easily. To this end, in the embodiment of the present invention, as shown in FIG. 1, a terminal frame 132 connected to the plurality of wiring lines 130 is provided on the base frame 12, at a position between the positive electrode bus bar 42 and the negative electrode bus bar 52. Further, a member for inserting the plurality of wiring lines 130, in particular, the member (e.g., bellows tube 134) for inserting the plurality of wiring lines 130 in the hermetical, air tight state is provided between the terminal frame 132 and one of the positive electrode bus bar 42 and the negative electrode bus bar 52 (in the example of FIG. 1, the positive electrode bus bar 42).

Figure 9:
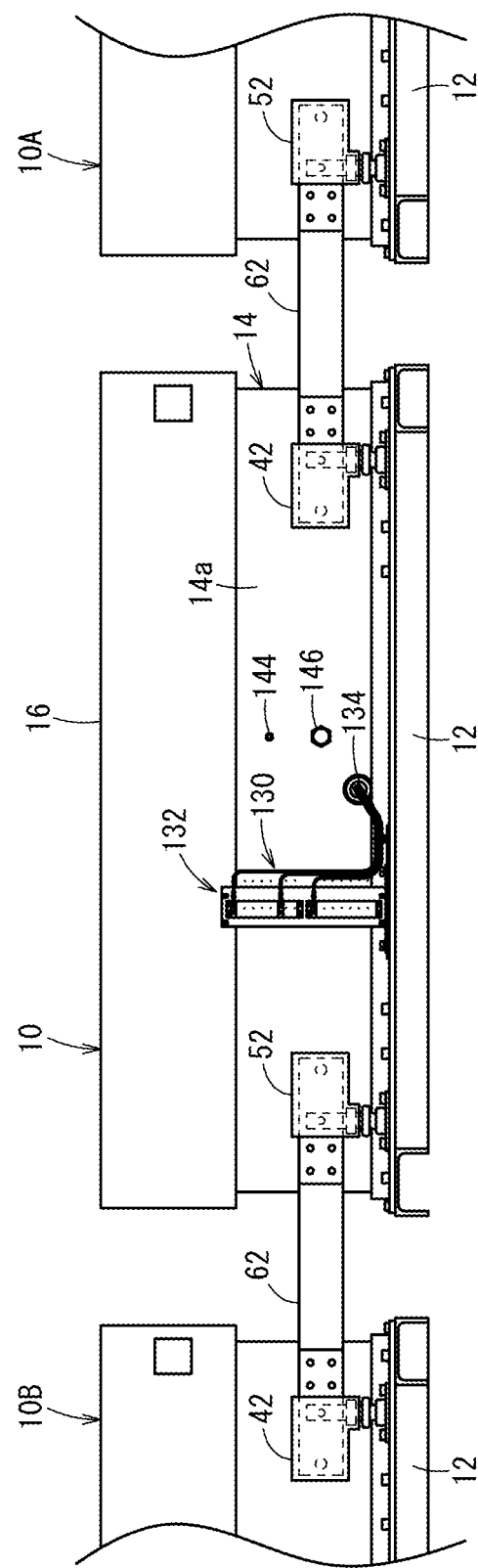
FIG. 9 is a front view showing a state where a plurality of battery assembly containers are connected by the electrically conductive members, with partial omission.

Further, in the embodiment of the present invention, a lead-out direction of a connector portion of the electrically conductive member 62 connected to the positive electrode bus bar 42 and a lead-out direction of a connector portion of the electrically conductive member 62 connected to the negative electrode bus bar 52 are oriented away from each other. In the structure, in the case of connecting the plurality of battery assembly containers 10 in series, as shown in FIG. 9, the electrically conductive member 62 connected to the positive electrode bus bar 42 of the battery assembly container 10 is connected to the negative electrode bus bar 52 of an adjacent battery assembly container 10A provided on one side in the lateral direction (battery cell assembly container on the right side in FIG. 9). Likewise, the electrically conductive member 62 connected to the negative electrode bus bar 52 of the battery assembly container 10 is connected to the positive electrode bus bar 42 of an adjacent battery assembly container 10B provided on the other side in a lateral direction (battery cell assembly container on the left side in FIG. 9).

Therefore, in the embodiment of the present invention, the plurality of wiring lines 130 can be provided between the positive electrode bus bar 42 and the negative electrode bus bar 52, at the position where no interference with the electrically conductive members 62 occurs, and locally in the terminal frame 132. The position where no interference with the electrically conductive members 62 occurs is shown in FIG. 1, for example, as a position where a projected area Z3 of the wiring lines 130 on the base frame 12 does not overlap with projected areas Z1, Z2 of the electrically conductive members 62 (connected to the positive electrode bus bar 42 and the negative electrode bus bar 52, respectively) on the base frame 12. Therefore, the plurality of wiring lines 130 such as the above described heater wiring lines 130*a* and the signal lines 130*b*, 130*c* can be provided at the position where no interference with the electrically conductive member 62 occurs. Even if operation to provide the plurality of wiring lines 130 is performed after connecting the electrically conductive members 62, the wiring lines 130 can be provided without obstruction by the electrically conductive members 62. Likewise even in the case of connecting the electrically conductive member 62 after operation of providing the plurality of wiring lines, the electrically conductive member 62 can be connected without obstruction by the plurality of wiring lines 130. Consequently, the operation of providing the wiring lines can be performed reliably and promptly.

Further, since the electrically conductive members 62 for electrically connecting the plurality of battery assembly containers 10 are arranged in the lateral direction of the battery assembly containers 10, for example, even if the battery assembly 20 is partially combusted, the electrically conductive members 62 and the plurality of wiring lines 130 are not affected by the combustion easily. Even if the electrically conductive member 62 is affected by the combustion, as described above, since electrical insulation is achieved by positioning insulating material (insulator 88) between the base frame 12 and the positive electrode bus bar 42 and between the base frame 12 and the negative electrode bus bar 52, the electrically conductive member 62 is not detached easily, and the electrically conductive member 62 is kept insulated electrically. It is possible to avoid occurrence of short circuiting at multiple points.

Further, in the terminal frame 132, terminals 136 corresponding to the number of the plurality of wiring lines 130 are arranged in the vertical direction such that at least a group of a plurality of terminals 136*a* for heater wires, a group of a plurality of terminals 136*b* for signal lines (block voltage), and a group of a plurality of terminals 136*c* for signal lines (temperature) are arranged separately. Therefore, the heater wiring lines 130*a* and the signal lines 130*b*, 130*c* are provided locally in the terminal frame 132 at the position where no interference with the electrically conductive member 62 occurs. Further, it is possible to easily recognize which wiring line should be connected to which terminal. Accordingly, improvement in the reliability and swiftness in operation of providing wiring lines is achieved.

In the case where the number of wiring lines to be connected is increased, the size of this terminal frame 132 in the vertical direction is increased, and the terminal frame 132 may contact the lid body 16 undesirably. Therefore, in the embodiment of the present invention, the terminal frame 132 is configured to have no interference with the lid body 16. Specifically, as shown in FIGS. 10A and 10B, the terminal frame 132 includes a mount frame 138 fixed to the base frame 12, and a terminal plate 140 fixed to the front side of the mount frame 138. An upper end 138a of the mount frame 138 is positioned below a lower end 28a of the eaves 28 of the lid body 16. A gap 142 is formed between a portion of the terminal plate 140 fixed to the front side of the mount frame 138, facing the side surface of the eaves 28 of the lid body 16, and a portion of the side surface of the eaves 28 facing the terminal plate 140. In the structure, the terminal frame 132 is configured to have no interference with the lid body 16. Accordingly, even if the number of terminals 136 arranged on the terminal frame 132 is increased, the terminal frame 132 does not contact the lid body 16. Accordingly, it is possible to cope with the increase in the number of battery cells 18 accommodated in the box body 14, and the increase in the number of measured points easily.

Further, in the embodiment of the present invention, as shown in FIG. 1, a vacuum sensor 144 and a vacuum seal plug 146 used for adjusting the degree of vacuum in the box body 14 are provided in the outer surface of the first side wall 14a of the box body 14, at positions between the positive electrode bus bar 42 and the negative electrode bus bar 52. In the example of FIG. 1, the vacuum sensor 144 and the vacuum seal plug 146 are provided between the bellows tube 134 and the positive electrode bus bar 42, and in particular, the vacuum sensor 144 is provided immediately above the vacuum seal plug 146. In this case, the terminal frame 132 is provided on the left side of the bellows tube 134, and the vacuum sensor 144 and the vacuum seal plug 146 are provided on the right side of the bellows tube 134. Therefore, the vacuum sensor 144 and the vacuum seal plug 146 are provided at positions where no interference with at least the electrically conductive members 62, the terminal frame 132 and the plurality of wiring lines 130 occurs. Therefore, evacuation operation and sealing operation in the box body 14 can be performed without obstruction by the plurality of wiring lines 130, the terminal frame 132, etc., and improvement in the work efficiency in these operations can be achieved.

It should be noted that the positions of providing the terminal frame 132, the bellows tube 134, the vacuum sensor 144, and the vacuum seal plug 146 can also be adopted preferably in first to fifth modified examples shown in FIGS. 11 to 15 in addition to the example of FIG. 1.

Figure 11:
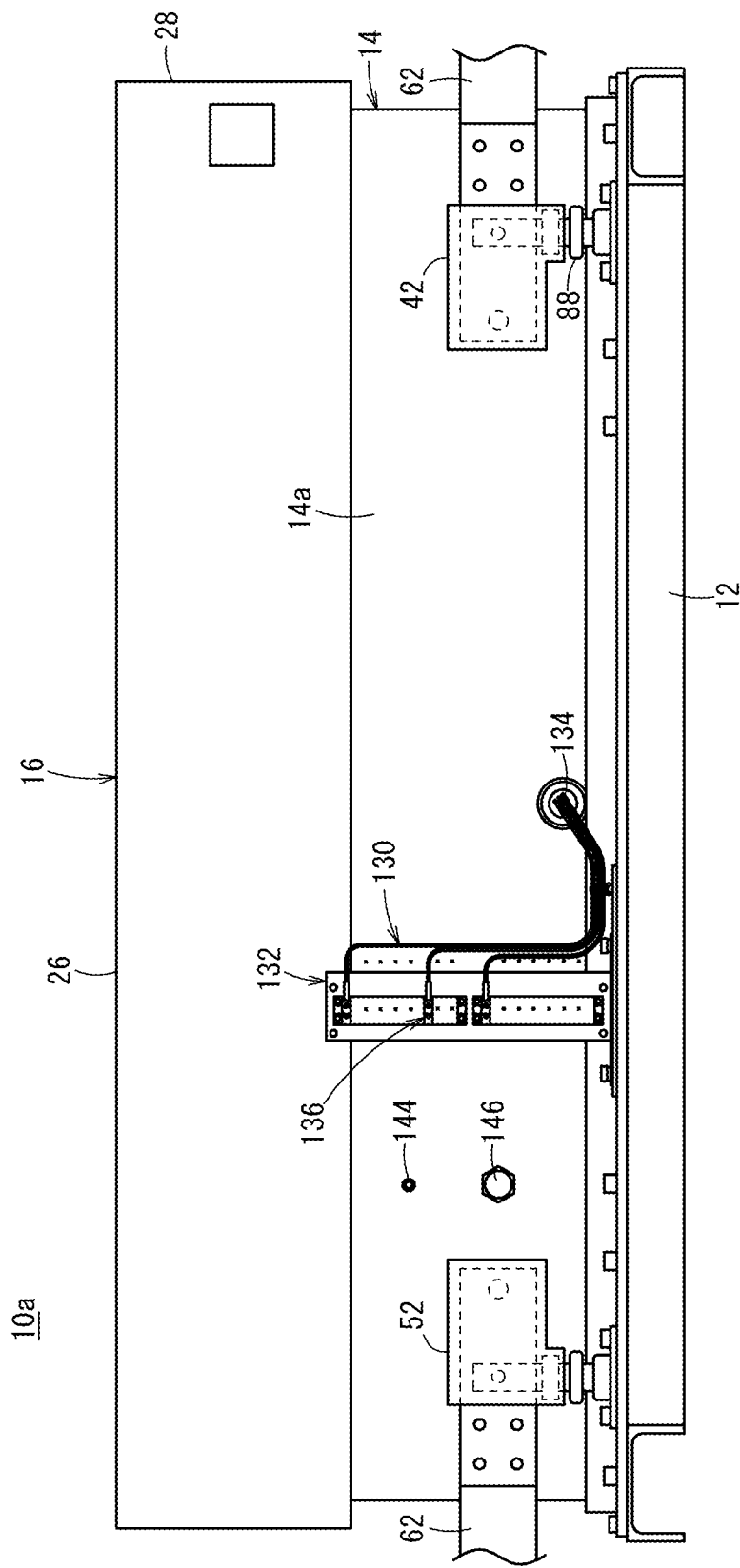
FIG. 11 is a front view showing a first modified example of the battery assembly container.

Specifically, in the first modified example (battery assembly container 10a), as shown in FIG. 11, the terminal frame 132 is provided between the bellows tube 134 and the negative electrode bus bar 52, and the vacuum sensor 144 and the vacuum seal plug 146 are provided between the terminal frame 132 and the negative electrode bus bar 52.

Figure 12:
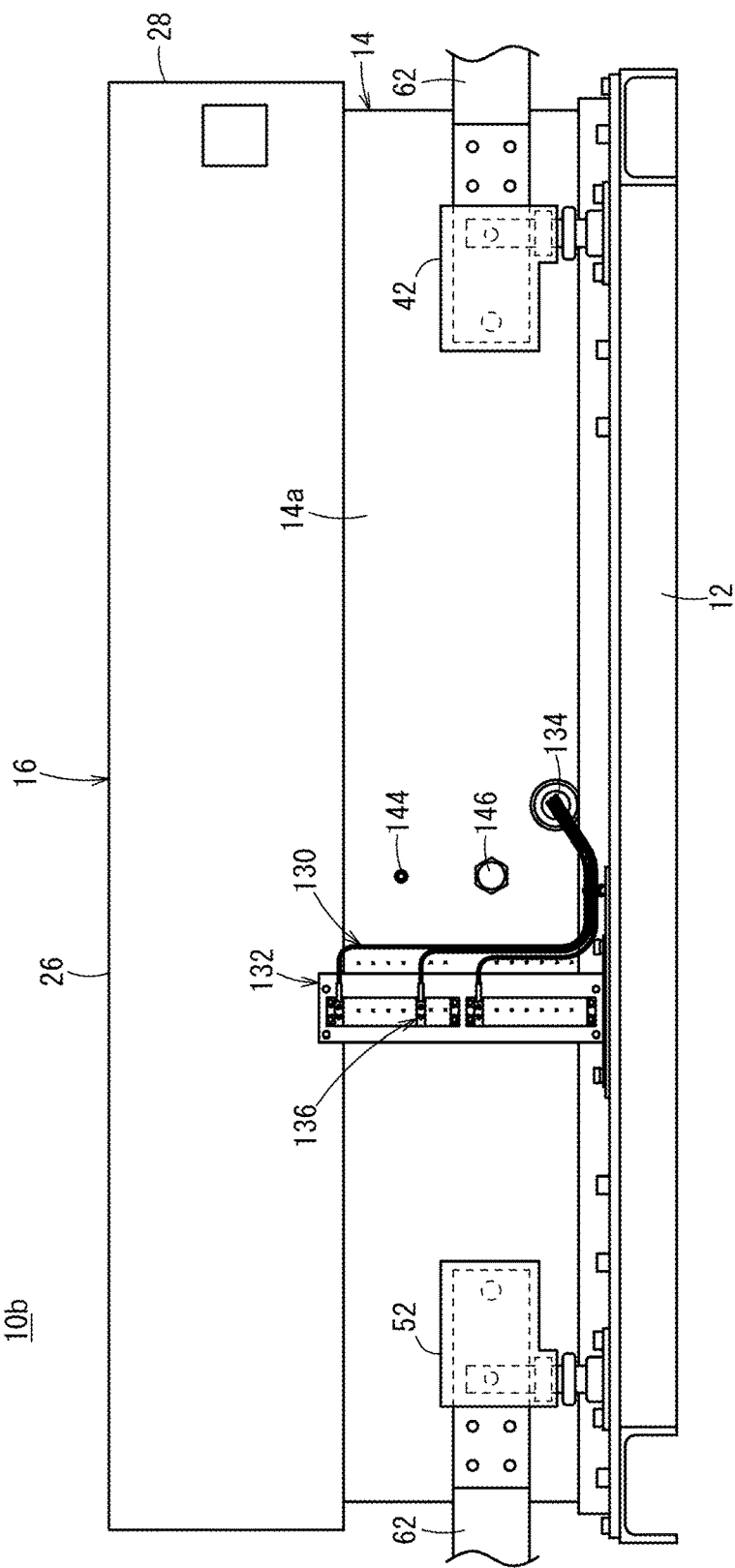
FIG. 12 is a front view showing a second modified example of the battery assembly container.

In the second modified example (battery assembly container 10b), as shown in FIG. 12, the terminal frame 132 is provided between the bellows tube 134 and the negative electrode bus bar 52, and the vacuum sensor 144 and the vacuum seal plug 146 are provided between the bellows tube 134 and the terminal frame 132. In this case, the terminal frame 132 may be provided at a position closer to the negative electrode bus bar 52.

Figure 13:
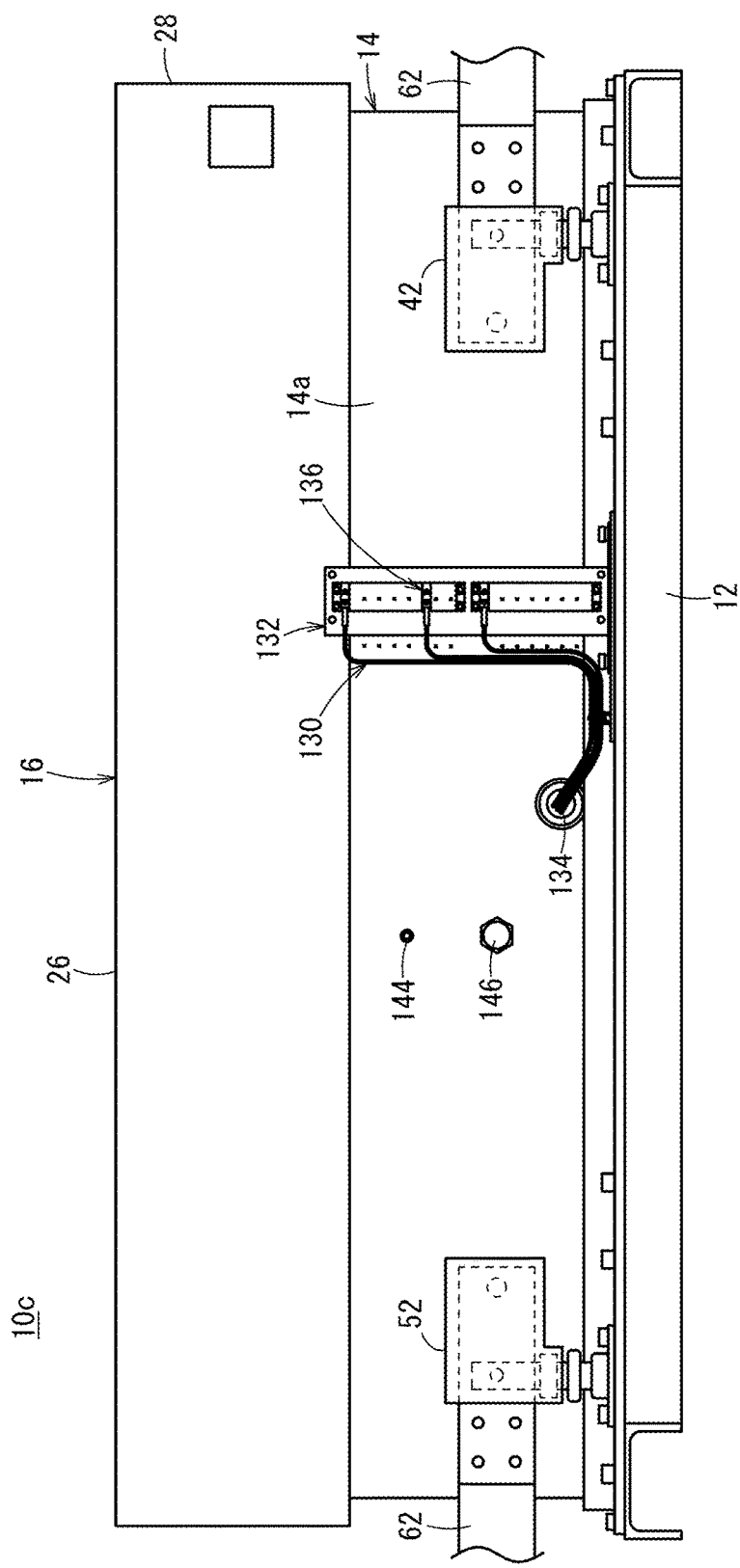
FIG. 13 is a front view showing a third modified example of the battery assembly container.

In the third modified example (battery assembly container 10c), as shown in FIG. 13, the terminal frame 132 is provided between the bellows tube 134 and the positive electrode bus bar 42, and the vacuum sensor 144 and the vacuum seal plug 146 are provided between the bellows tube 134 and the negative electrode bus bar 52.

Figure 14:
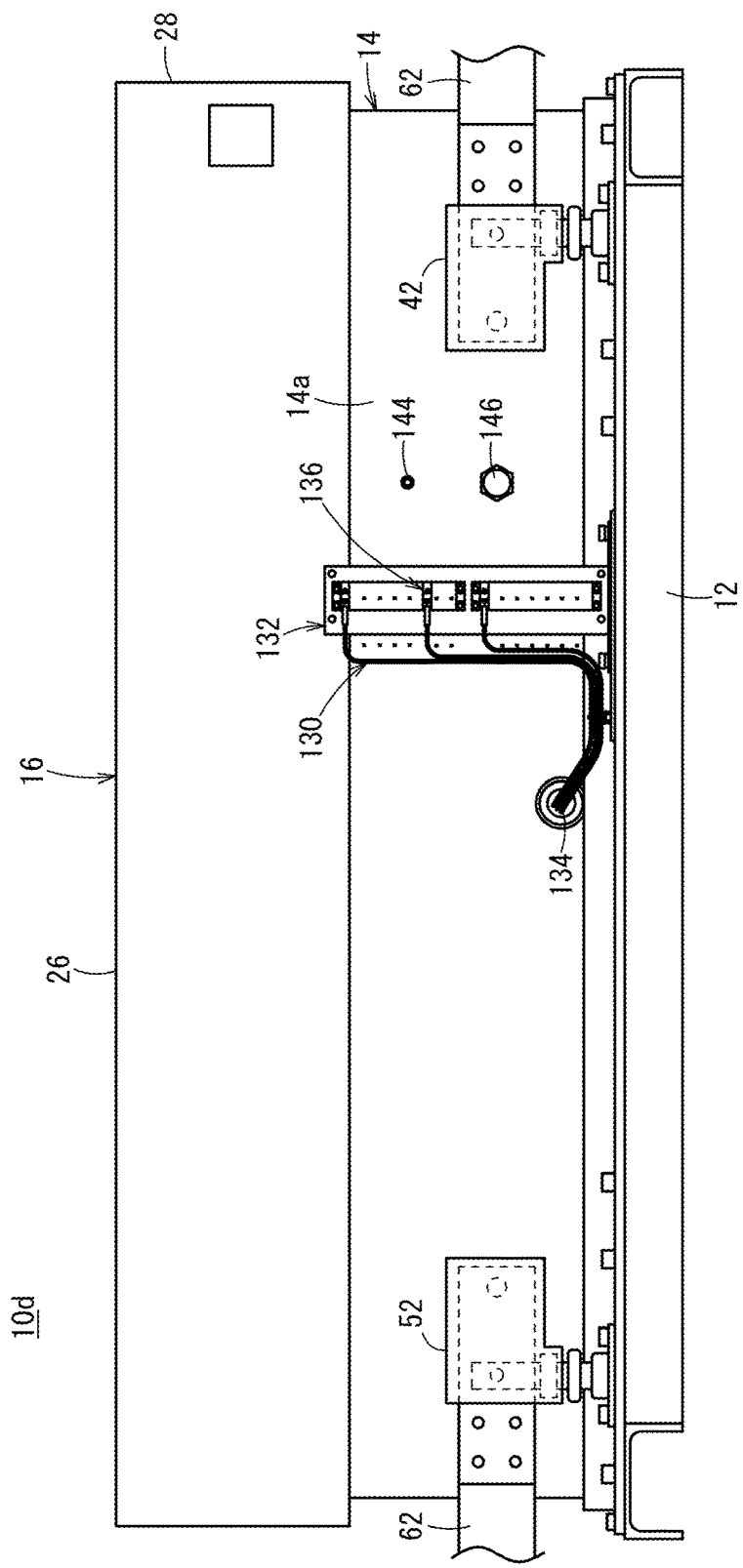
FIG. 14 is a front view showing a fourth modified example of the battery assembly container.

In the fourth modified example (battery assembly container 10d), as shown in FIG. 14, the terminal frame 132 is provided between the bellows tube 134 and the positive electrode bus bar 42, and the vacuum sensor 144 and the vacuum seal plug 146 are provided between the terminal frame 132 and the positive electrode bus bar 42.

Figure 15:
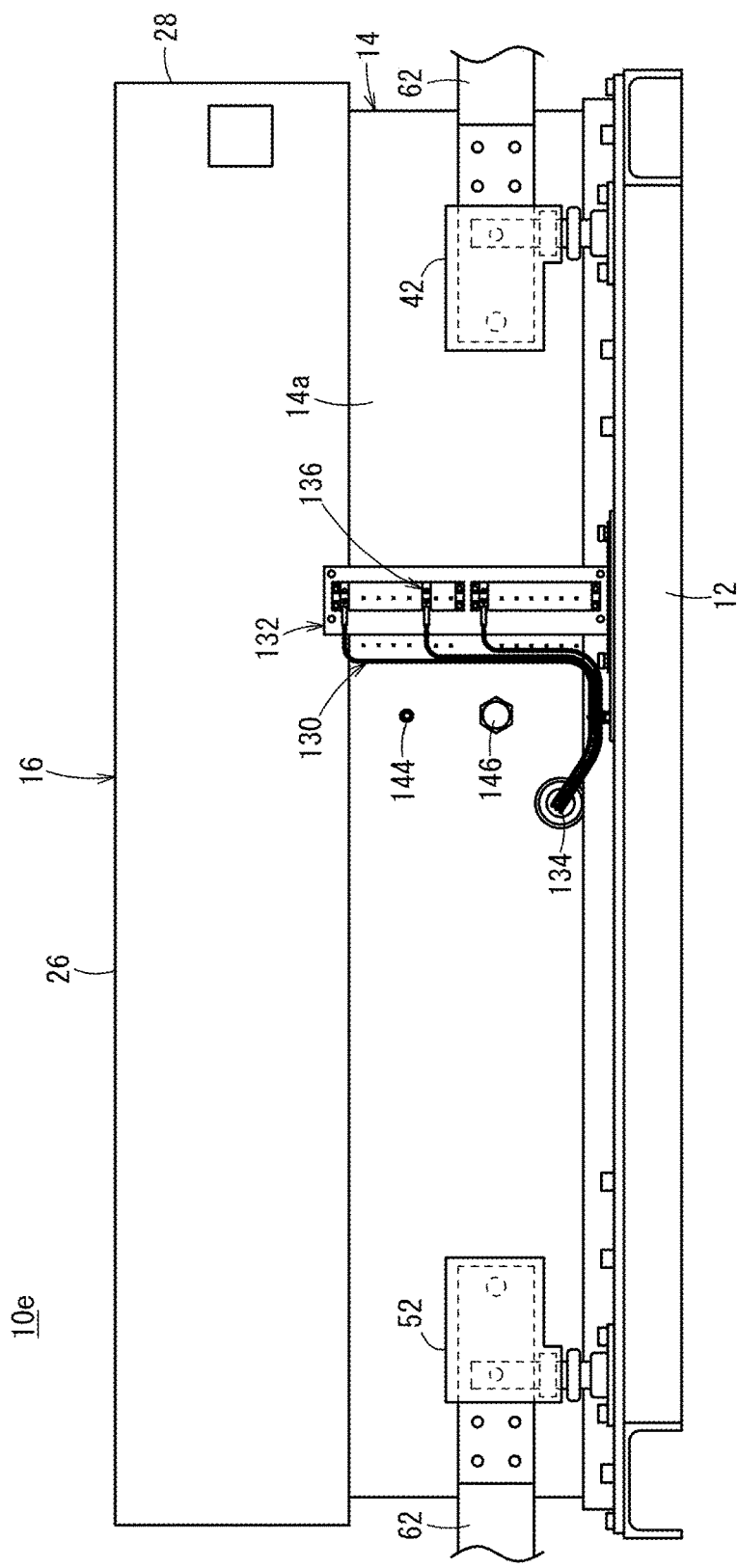
FIG. 15 is a front view showing a fifth modified example of the battery assembly container.

In the fifth modified example (battery assembly container 10e), as shown in FIG. 15, the terminal frame 132 is provided between the bellows tube 134 and the positive electrode bus bar 42, and the vacuum sensor 144 and the vacuum seal plug 146 are provided between the bellows tube 134 and the terminal frame 132. In this case, the terminal frame 132 may be provided at a position closer to the positive electrode bus bar 42.

Among the first to fifth modified examples, in the first modified example, the third modified example, and the fourth modified example, as in the case of the embodiment of the present invention, the vacuum sensor 144 and the vacuum seal plug 146 can be provided at positions where no interference with at least the electrically conductive member 62, the terminal frame 132, and the plurality of wiring lines 130 occurs.

It is a matter of course that the battery assembly container according to the present invention is not limited to the embodiments described above, and various structures can be adopted without deviating from the gist of the present invention.

What is claimed is:

1. A battery assembly container comprising:
    a metal base frame;
    a box body fixed to the base frame, the box body including an opening in an upper surface of the box body, and accommodating a battery assembly;
    a lid body configured to close the opening of the box body;
    a positive electrode external terminal and a negative electrode external terminal provided for one outer surface of the box body, and connected to electrically conductive members, respectively;
    a plurality of wiring lines extending from outside of the box body to inside of the box body;
    a terminal frame provided on the base frame and connected to the plurality of wiring lines; and
    a vacuum sensor and a vacuum seal plug used for adjusting a degree of vacuum inside the box body are provided in the outer surface of the box body, at positions between the positive electrode external terminal and the negative electrode external terminal,
    wherein the plurality of wiring lines are provided between the positive electrode external terminal and the negative electrode external terminal at a position where no interference with the electrically conductive members occurs, and
    wherein the position where no interference with the electrically conductive members occurs represents a position where a projected area of the plurality of wiring lines on the base frame does not overlap with projected areas of the electrically conductive members on the base frame, the electrically conductive members being connected to the positive electrode external terminal and the negative electrode external terminal, respectively.

2. The battery assembly container according to claim 1, wherein a lead-out direction of a connector portion of the electrically conductive member connected to the positive electrode external terminal and a lead-out direction of a connector portion of the electrically conductive member connected to the negative electrode external terminal are oriented away from each other.

3. The battery assembly container according to claim 2, wherein the electrically conductive member connected to the positive electrode external terminal is connected to a negative electrode external terminal of an adjacent battery assembly container provided on one side in a lateral direction; and the electrically conductive member connected to the negative electrode external terminal is connected to a positive electrode external terminal of an adjacent battery assembly container provided on another side in the lateral direction.

4. The battery assembly container according to claim 1, wherein the terminal frame is provided on the base frame, at a position between the positive electrode external terminal and the negative electrode external terminal.

5. The battery assembly container according to claim 4, wherein the terminal frame is configured to have no interference with the lid body.

6. The battery assembly container according to claim 5, wherein the configuration having no interference with the lid body includes a gap formed at least between a portion of the terminal frame facing the lid body and a portion of the lid body facing the terminal frame.

7. The battery assembly container according to claim 4, wherein a member configured to insert the plurality of wiring lines connected to the terminal frame is provided in the outer surface of the box body, at a position between the terminal frame and one of the positive electrode external terminal and the negative electrode external terminal; and the vacuum sensor and the vacuum seal plug used for adjusting the degree of vacuum inside the box body are provided in the outer surface of the box body, at positions between the member and the one of the positive electrode external terminal and the negative electrode external terminal.

8. The battery assembly container according to claim 4, wherein a member configured to insert the plurality of wiring lines connected to the terminal frame is provided in the outer surface of the box body, at a position between the terminal frame and one of the positive electrode external terminal and the negative electrode external terminal; and the vacuum sensor and the vacuum seal plug used for adjusting the degree of vacuum inside the box body are provided in the outer surface of the box body, at positions between the terminal frame and another of the positive electrode external terminal and the negative electrode external terminal.

9. The battery assembly container according to claim 4, wherein a member configured to insert the plurality of wiring lines connected to the terminal frame is provided in the outer surface of the box body, at a position between the terminal frame and one of the positive electrode external terminal and the negative electrode external terminal; and the vacuum sensor and the vacuum seal plug used for adjusting the degree of vacuum inside the box body are provided in the outer surface of the box body, at positions between the terminal frame and the member.

10. The battery assembly container according to claim 1, wherein a member configured to insert the plurality of wiring lines is provided in the outer surface of the box body, at a position between the positive electrode external terminal and the negative electrode external terminal.

* * * * *